(12) United States Patent
Loehden et al.

(10) Patent No.: US 8,543,476 B2
(45) Date of Patent: Sep. 24, 2013

(54) SYSTEMS AND METHODS FOR CASH BASED ACCOUNTING IN A GENERAL LEDGER

(75) Inventors: Michel Loehden, Rimbach (DE);
Ruediger Raubeck, Ettlingen (DE);
Vladimir Sept, Sinsheim-Weiler (DE)

(73) Assignee: SAP AG, Walldorf (DE)

( * ) Notice: Subject to any disclaimer, the term of this patent is extended or adjusted under 35 U.S.C. 154(b) by 420 days.

(21) Appl. No.: 12/078,338

(22) Filed: Mar. 28, 2008

(65) Prior Publication Data

US 2009/0248554 A1 Oct. 1, 2009

(51) Int. Cl.
*G07F 7/10* (2006.01)

(52) U.S. Cl.
USPC .................. 705/33; 705/30; 705/31; 705/32; 705/35; 705/42; 705/70

(58) Field of Classification Search
USPC ......................................................... 705/30
See application file for complete search history.

(56) References Cited

U.S. PATENT DOCUMENTS

| | | | |
|---|---|---|---|
| 3,790,260 A * | 2/1974 | Boyd et al. ............... | 351/159.01 |
| 6,041,312 A * | 3/2000 | Bickerton et al. .......... | 705/36 R |
| 7,568,615 B2 * | 8/2009 | Corona et al. ................. | 235/379 |
| 2001/0025262 A1 * | 9/2001 | Ahmed ........................... | 705/33 |
| 2001/0029475 A1 * | 10/2001 | Boicourt et al. ................. | 705/30 |
| 2003/0046194 A1 * | 3/2003 | McClendon et al. ........... | 705/30 |
| 2005/0192876 A1 * | 9/2005 | McKee, Jr. ..................... | 705/30 |
| 2007/0233541 A1 * | 10/2007 | Schorr et al. ...................... | 705/8 |
| 2008/0065518 A1 * | 3/2008 | Sinha et al. ..................... | 705/31 |
| 2008/0120129 A1 * | 5/2008 | Seubert et al. ..................... | 705/1 |
| 2009/0094112 A1 * | 4/2009 | Cesarini et al. ................. | 705/14 |

* cited by examiner

*Primary Examiner* — Fateh Obaid
(74) *Attorney, Agent, or Firm* — Finnegan, Henderson, Farabow, Garrett & Dunner LLP

(57) ABSTRACT

In one exemplary embodiment, a method provides a cash ledger. The cash ledger may contain at least one line item and a clearing account. The method may post a payment, which contains at least one line item, to a bank account and clear a business partner account by posting the payment against the business partner account.

9 Claims, 4 Drawing Sheets

Bank Statement 300

| GL account | Substitution for cash ledger | Amount | CASH_ACCOUNT | RE_ACCOUNT | Segment/Profit Center Business Area / Fund | |
|---|---|---|---|---|---|---|
| Bank | Bank | Debit 10 | Bank | Advance | Dummy | ⌐ 310 |
| Bank Clearing | Advance | Credit 10 | Bank | Advance | Dummy | |

Invoice

| GL account | Substitution for cash ledger | Amount | CASH_ACCOUNT | RE_ACCOUNT | Segment/Profit Center Business Area / Fund | |
|---|---|---|---|---|---|---|
| Business Partner | | Debit 10 | | Revenue/Expense | A | ⌐ 320 |
| Revenue/Expense | | Credit 10 | | Revenue/Expense | A | |

Payment

| GL account | Substitution for cash ledger | Amount | CASH_ACCOUNT | RE_ACCOUNT | Segment/Profit Center Business Area / Fund | |
|---|---|---|---|---|---|---|
| Bank Clearing | | Debit 10 | | Revenue/Expense | A | ⌐ 330 |
| Business Partner | | Credit 10 | | Revenue/Expense | A | |

Clearing

| GL account | Substitution for cash ledger | Amount | CASH_ACCOUNT | RE_ACCOUNT | Segment/Profit Center Business Area / Fund | |
|---|---|---|---|---|---|---|
| Bank Clearing | Advance | Debit 10 | Bank | Advance | Dummy | |
| Bank Clearing | Revenue/Expense | Credit 10 | Bank | Revenue/Expense | A | ⌐ 340 |
| Zero-Balance Clearing Account | Bank | Credit 10 | Bank | Advance | Dummy | |
| Zero-Balance Clearing Account | Bank | Debit 10 | Bank | Revenue/Expense | A | |

300

Bank Statement

| GL account | Substitution for cash ledger | Amount | CASH_ACCOUNT | RE_ACCOUNT | Segment/Profit Center Business Area / Fund |
|---|---|---|---|---|---|
| Bank | Bank | Debit 10 | Bank | Advance | Dummy |
| Bank Clearing | Advance | Credit 10 | Bank | Advance | Dummy |

310

Invoice

| GL account | Substitution for cash ledger | Amount | CASH_ACCOUNT | RE_ACCOUNT | Segment/Profit Center Business Area / Fund |
|---|---|---|---|---|---|
| Business Partner | | Debit 10 | | Revenue/Expense | A |
| Revenue/Expense | | Credit 10 | | Revenue/Expense | A |

320

Payment

| GL account | Substitution for cash ledger | Amount | CASH_ACCOUNT | RE_ACCOUNT | Segment/Profit Center Business Area / Fund |
|---|---|---|---|---|---|
| Bank Clearing | | Debit 10 | | Revenue/Expense | A |
| Business Partner | | Credit 10 | | Revenue/Expense | A |

330

Clearing

| GL account | Substitution for cash ledger | Amount | CASH_ACCOUNT | RE_ACCOUNT | Segment/Profit Center Business Area / Fund |
|---|---|---|---|---|---|
| Bank Clearing | Advance | Debit 10 | Bank | Advance | Dummy |
| Bank Clearing | Revenue/Expense | Credit 10 | Bank | Revenue/Expense | A |
| Zero-Balance Clearing Account | Bank | Credit 10 | Bank | Advance | Dummy |
| Zero-Balance Clearing Account | Bank | Debit 10 | Bank | Revenue/Expense | A |

SYSTEMS AND METHODS FOR CASH BASED ACCOUNTING IN A GENERAL LEDGER

TECHNICAL FIELD

The present invention generally relates to the field of data processing and to financial systems and methods for balancing payments. More particularly, and without limitation, the invention relates to computer systems and methods for providing a cash ledger for a retrospective projection of payments along a process chain.

BACKGROUND INFORMATION

Cash accounting is required by most public and private sector organizations. Furthermore, most organizations have to report a full set of financial statements.

Today, many corporate groups and other organizations must comply with a plurality of statutory accounting principles when preparing and publishing their annual financial statements. For example, a German group listed on a U.S. stock exchange must submit a financial statement under US-GAAP and/or IAS as well as under HGB. It is possible that further financial statements are necessary, for example, for subsidiaries in Asian countries, according to local rules.

In addition to these financial statements prescribed by law, the preparation of financial statements for various organizational units of an enterprise that are as informative as possible are required for internal uses. For example, such financial statements provide management with as comprehensive a picture as possible on the development of individual projects or company segments or product groups. The organizational units of an enterprise may be cost centers, profit centers, or segments or lines of business. In the media industry, such an organizational unit may, for example, involve a single title or, in the insurance industry, a single type or line of insurance business.

All company reports of a corporate entity are based on business transactions, each of which is to be recorded by a document. For example, a business transaction may be recorded by an incoming supplier invoice or the withdrawal of goods from the stores for production purposes. Large corporate entities incur thousands or hundreds of thousands of transactions each day. For that reason, accounting for a large corporate entity can be accomplished only with the use of data processing systems if related efforts are to be justifiable.

In view of the foregoing, corporate entities and other organizations require improved data processing systems and methods that provide a summarized reporting of their cash flow, so that they can view money paid and money received. Such systems and methods must be capable of providing relevant balance and other accounting information, even for entities that incur a large number of daily transactions. Therefore, there is thus a need to provide an improved accounting tool to facilitate a retrospective projection of information along a process chain.

SUMMARY

Embodiments of the present invention encompass methods, apparatus, and computer program products for cash based accounting. Embodiments of the invention may facilitate, for example, a retrospective projection of information along a process chain.

In one exemplary embodiment, there is provided a computer-readable medium containing instructions to configure a processor to perform a method for facilitating cash based accounting. The method may include, for example, providing a cash ledger. The cash ledger may contain at least one line item and a clearing account. The method may include posting a payment, which contains at least one line item, to a bank account and clearing a business partner account by posting the payment against the business partner account. The method may also include determining a revenue account from the cleared business partner account and clearing the at least one line item in the payment.

In another exemplary embodiment, there is provided a computerized system for facilitating cash based accounting. The system comprises, for example, a processor and a memory, wherein the processor and the memory are configured to perform a method. The method may include, for example, providing a cash ledger. The cash ledger may contain at least one line item and a clearing account. The method may include posting a payment, which contains at least one line item, to a bank account and clearing a business partner account by posting the payment against the business partner account. The method may also include determining a revenue account from the cleared business partner account and clearing the at least one line item in the payment.

In another exemplary embodiment, there is provided a method for facilitating cash based accounting. The method may include, for example, providing a cash ledger. The cash ledger may contain at least one line item and a clearing account. The method may include posting a payment, which contains at least one line item, to a bank account and clearing a business partner account by posting the payment against the business partner account. The method may also include determining a revenue account from the cleared business partner account and clearing the at least one line item in the payment.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

FIG. 3 depicts an exemplary screenshot of a payment on account, consistent with certain aspects related to the present invention.

DETAILED DESCRIPTION

Figure 1:
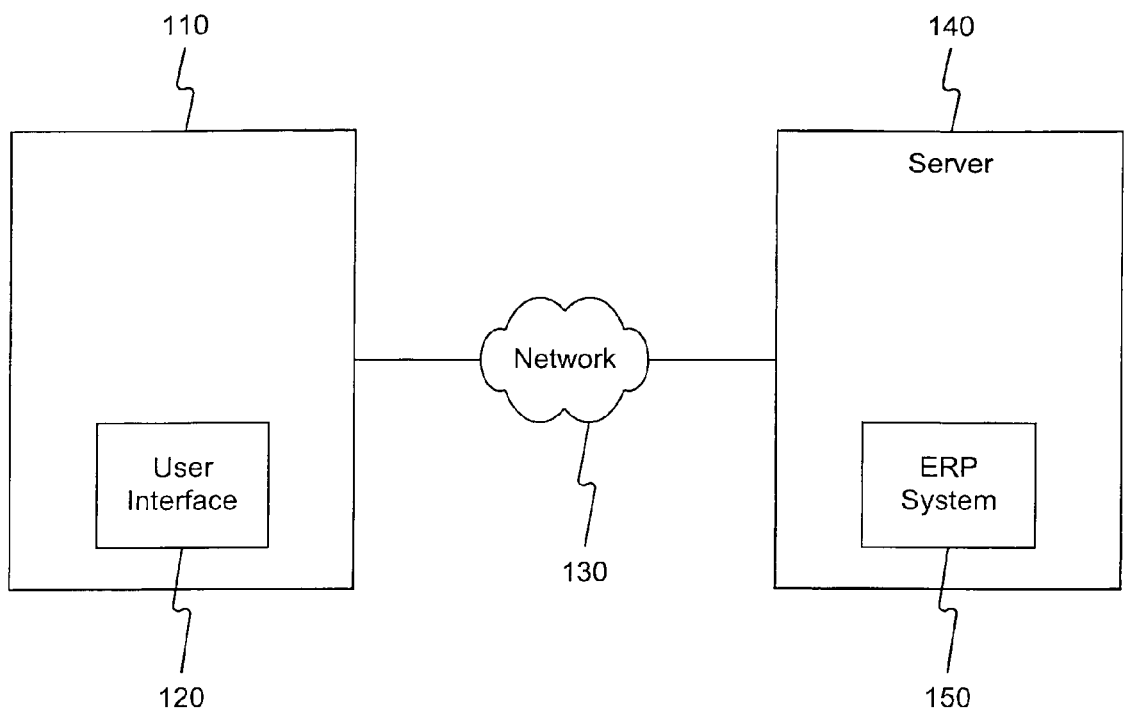
FIG. 1 illustrates a block diagram of an exemplary system environment, consistent with certain aspects related to the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 illustrates a block diagram of an exemplary system environment 100, consistent with certain aspects related to the present invention. Referring to FIG. 1, system 100 includes a client system 110 connected to a server system 140 by a network 130. The client system includes a user interface 120, and the server system 140 includes an ERP system 150. Although the description of system 100 is made in the context of a client-server environment, other system environments and arrangements can be used instead. Further, although reference is made to ERP systems 150 in describing embodiments of the invention, other types of business or financial system applications may be employed alone or in any suitable combination.

The client system 110 may include one or more processors, such as a computer, to interface with server system 140. Server 140 may include one or more processors, such as computers. User interface 120 may provide an interface to allow a user to interact with other applications, such as allowing the user to instantiate applications on server system 140. User interface 120 may be implemented as a graphical user interface for receiving information from ERP system 150. By way of an example, a Web browser may be used as user interface 120. As used herein, the term "instantiate" means, in an object oriented programming environment, an object of a particular class, and, more generally, includes deploying, customizing, running and/or executing an application.

A computer suitable for use as a client or a server includes, among other things, a processor for executing instructions and one or more memory devices for storing computer program instructions and data. The computer may also receive data from and/or transfer data to one or more mass storage devices for storing data, e.g., magnetic, magneto optical disks, or optical disks. Furthermore, the computer may be capable of interfacing to a network, such as network 130.

Network 130 may include, alone or in any suitable combination, a telephony-based network, a local area network (LAN), a wide area network (WAN), a dedicated intranet, a wireless LAN, the Internet, a wireless network, a bus, and/or any other any communication mechanisms. Further, any suitable combination of wired and/or wireless components and systems may be used to provide a communication mechanism. Moreover, network 130 may be embodied using bidirectional or unidirectional communication links. Further, network 130 may utilize one or more protocols such as Transmission Control Protocol/Internet Protocol (TCP/IP), Hyper Text Transfer Protocol (HTTP), SOAP (Simple Object Access Protocol), and Remote Procedure Call (RPC).

Figure 2:
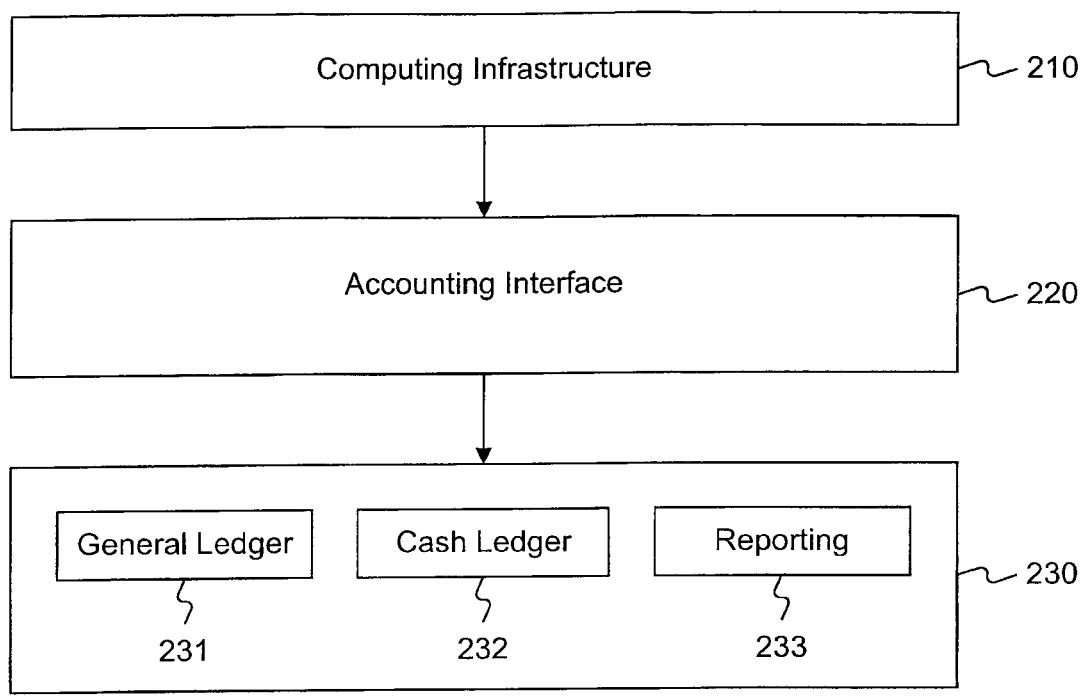
FIG. 2 depicts another block diagram of an exemplary Enterprise Resource Planning ("ERP") system, consistent with certain aspects related to the present invention.

FIG. 2 illustrates a detailed exemplary embodiment of ERP system 150. As shown in FIG. 2, ERP system 150 may include a computing infrastructure 210, an accounting interface 220, and one or more modules 230.

Computing infrastructure 210 may include one or more servers and storage devices. The servers and storage devices may be collocated with each other or may be distributed across multiple locations.

Accounting interface 220 may reside on computing infrastructure 210 and provide the foundation for collecting accounting information. Such information may include accounts payable and accounts receivable. Accounting interface 220 may enable an organization to utilize the large amount of data amassed and needed to conduct operations by providing a centralized source for collecting, interpreting, consolidating, and redistributing data that arrives from a variety of systems. Accounting interface 220 may ensure that all accounts are balanced according to preconfigured rules. There are several ways that accounts may be balanced. They may be balanced by segment (such as a branch of an organization, including, for example, licensing, consulting, and training), profit center (such as a regional office or group within the office), business area, and fund, for example.

Module 230 may comprise one or more software packages that are dedicated to specific operation tasks. For example, module 230 may include general ledger 231, cash ledger 232, and reporting 233.

General ledger 231 may provide the basis for external reporting of information. General ledger 231 may keep track of the income, balance sheets, and transactions that affect an income statement. General ledger 231 may provide balance sheets, income statements, and cash flow so that users can view how money is received and spent.

General ledger 231 and cash ledger 232 may receive all of the information from accounting interface 220. Cash ledger 232 may be a complete, balanced set of accounts required by and maintained for cash basis accounting. Normally, all cash relevant business processes are recorded, or posted, in cash ledger 232. The postings may contain the cash account and the revenue/expense account. In addition, cash transfers from one revenue/expense account to another revenue/expense account (e.g., a new invoice reference for the partial payment or clearing of a payment on an account with an invoice) may be updated in cash ledger 232. Cash ledger 232 may realize both revenue and expense at the time cash is paid or received. Most of the postings to cash ledger 232 may be cash against revenue/expense postings.

Cash ledger 232 may be also be viewed as part of general ledger 231. Cash ledger 232 may be a non-leading ledger in the general ledger environment. To enable the reporting of cash information using account assignments, a new dimension within cash ledger 232 may be defined. This dimension is referred to herein as a revenue/expense account (RE_ACCOUNT). The RE_ACCOUNT may be populated with the values of the revenue accounts and expense accounts.

In addition to the RE_ACCOUNT, an additional dimension may be defined to memorize bank account information along a process chain. This dimension is referred to herein as a cash account (CASH_ACCOUNT). CASH_ACCOUNT may be populated with bank account information that may be contained in an original payment document.

Reporting 233 may obtain the balanced accounts from general ledger 231 and cash ledger 232 and report those results to the user. A user may obtain and view the results at user interface 120.

FIG. 3 illustrates an exemplary screenshot 300 of a payment on an account contained within a cash ledger document. The tables 310, 320, 330, 340 shown in FIG. 3 may be displayed separately or in any combination on user interface 120. Certain information within each of the tables may only be available depending on the status of the progress of the process chain. The name of the account within general ledger 231 may be shown in the "GL account" column. Further, in certain embodiments, the "Substitution for cash ledger" column is not displayed. In the embodiment of FIG. 3, the "Substitution for cash ledger" column is inserted to illustrate the logical replacement of the content of the "GL account" column by that of other columns, such as the "CASH_ACCOUNT" column which is explained below.

The value of the payment depicted in the bank statement may be shown in the "Amount" column. The "CASH_ACCOUNT" column may represent a physical column to store "GL account" information which is to be inherited along clearing chains. In certain embodiments, the "CASH_ACCOUNT" column may remain hidden to the user and not be offered on the user interface.

The variable corresponding to the RE_ACCOUNT may be shown in the "RE_ACCOUNT" column. In addition, a variable or identifier corresponding to the segment, profit center, business area, and/or fund associated with the payment may be depicted in the "Segment/Profit Center/Business Area/Fund" column.

In box 310, information concerning a bank statement is provided which is related to a payment on account. In this example, the payment is EUR 10. This is an exemplary embodiment, and many different payment values may be received and cleared as shown in FIG. 3. In this example, no invoice reference is available, therefore the payment cannot be directly assigned to the corresponding account (e.g., segment, profit center, business area, or fund). Because the corresponding account is not known at this time, a variable "Dummy" is placed within the "Segment/Profit Center/Business Area/Fund" column.

Even though the corresponding "Segment/Profit Center/Business Area/Fund" account is unknown, the payment may be updated within cash ledger 232. Therefore, variable "Bank," which may indicate the specific bank account that received the payment, is placed within the column CASH_ACCOUNT. In addition, variable "Advance" is placed within the column RE_ACCOUNT. Variable "Advance," which may represent a default value for the RE_ACCOUNT, is not specified at this time.

In the example of FIG. 3, the payment amount of EUR 10 in box 310 may be viewed as a debit, therefore a debit of EUR 10 is associated with the GL account "Bank" and cash ledger account "Bank." This results in a balance amounting to EUR 10 on the credit side of the GL account "Bank clearing" and cash ledger account "Advance." Because a payment of EUR 10 is posted to the bank account "Bank," the cash ledger is updated.

Box 320 depicts an invoice that may be generated and sent to a business partner. This invoice may correspond to payment that a business partner owes to a particular account (e.g., segment, profit center, business area, or fund) based on goods or services that the business partner received. In box 320, no payment is received, therefore cash ledger 232 is not updated at this time.

In box 320, the invoice may be associated with a particular business partner as shown with the GL account "Business Partner." In this example, the invoice is for EUR 10 and may be viewed as a debit from "Business Partner" and a corresponding credit to the associated GL account "Revenue/Expense." The invoice may contain the RE_ACCOUNT, therefore the RE_ACCOUNT column is updated to reflect this information. In this example, the RE_ACCOUNT is "Revenue/Expense." In addition, the appropriate account (e.g., segment, profit center, business area, or fund) that is sending the invoice for payment is known. Therefore, the "Segment/Profit Center/Business Area/Fund" column may reflect the appropriate account, which is account "A."

In box 330, a payment on an account may be received from the business partner. The payment may be viewed as a credit of EUR 10 to the GL account "Business Partner" and a corresponding debit of EUR 10 to the GL account "Bank Clearing." Consistent with box 320, the RE_ACCOUNT and "Segment/Profit Center/Business Area/Fund" may be known, and this information may be inherited from step 320. Therefore, the RE_ACCOUNT is "Revenue/Expense" and the "Segment/Profit Center/Business Area/Fund" is "A."

In box 340, the payment on an account is cleared. In the first row, the information from the GL account "Bank Clearing" in box 310 may be inherited. However, the amount may be viewed as a debit of EUR 10 to balance the credit of EUR 10 associated with the "Bank Clearing" box step 310. In the second row, the information from the GL account "Bank Clearing" in box 330 may also be inherited. However, the amount may be viewed as a credit of EUR 10 to balance the debit of EUR 10 associated with the "Bank Clearing" from box 330. At this time, the EUR 10 payment may be cleared by the GL account "Bank Clearing," and the original EUR 10 payment reflected on the bank statement is associated with the RE_ACCOUNT "revenue/expense" and "Segment/Profit Center/Business Area/Fund" "A."

In the third row, the information from the GL account "Bank" in box 310 may be inherited. However, the amount may be viewed as a credit of EUR 10 to balance the debit of EUR 10 associated with the "Bank" from box 310. In addition, a pre-defined clearing GL account is used to store clearing items, which are created automatically to ensure a document which is overall balanced by entity (i.e. Segment, Profit Center, Business Area or Fund). In this example, the GL account is named "Zero-Balance Clearing Account."

In the fourth row, the information from the GL account "Revenue/Expense" in box 320 may be inherited. However, the amount may be viewed as a debit of EUR 10 to balance the credit of EUR 10 associated with the "Revenue/Expense" from box 320. In addition, a different GL account may be may be used. In this example, the GL account is also "Zero-Balance Clearing Account." The "Substitution for cash ledger" column illustrates that the values within the GL account column should be substituted. Specifically, the "Zero-Balance Clearing Account" value is substituted with the "bank" value. The RE_ACCOUNT is "revenue/expense." At this time, the payment of EUR 10 has been cleared by GL account "Bank Clearing," which may result in a balance in cash ledger account "Bank."

Figure 4:
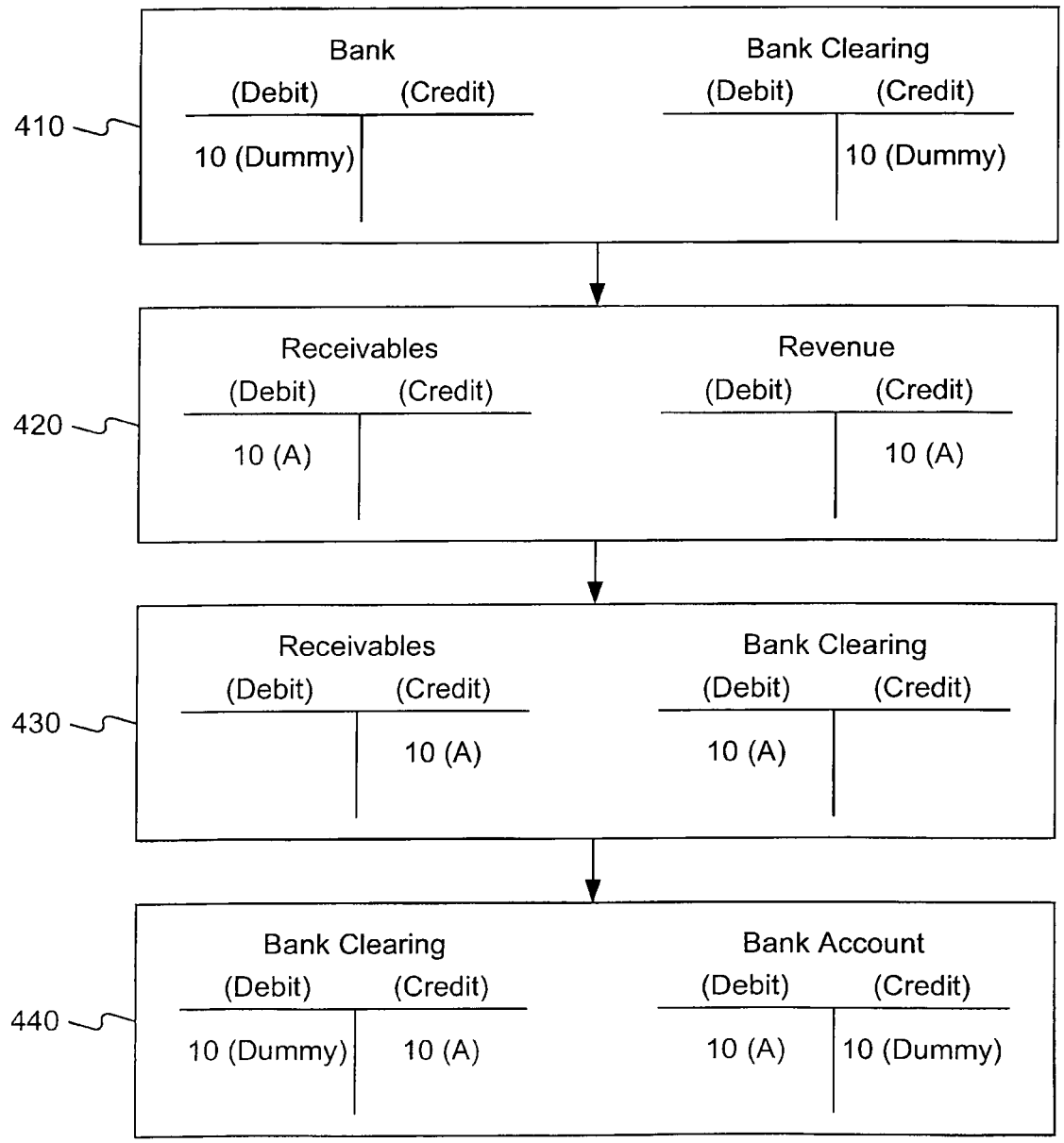
FIG. 4 depicts an exemplary flow diagram that illustrates clearing a payment, consistent with certain aspects related to the present invention.

FIG. 4 depicts an exemplary flow diagram 400 that illustrates clearing a payment on an account. In step 410, an incoming payment on an account of EUR 10 is reflected on the bank statement as a debit of EUR 10. At this time, the corresponding account (e.g., segment, profit center, business area, or fund) is not known, therefore a variable "Dummy" is associated with the payment on account. Because the payment must balance, a corresponding credit of EUR 10 may be reflected as a credit on the bank clearing. The credit of EUR 10 may also inherit the variable "Dummy."

In step 420, a business partner invoice may be generated for EUR 10. At this time, the corresponding account is known, and be referred to as "A." This may result in a debit of EUR 10 in a receivables account because the invoice has not been paid. This may also result in a credit of EUR 10 in a revenue account because payment is expected.

In step 430, a payment of EUR 10 corresponding to the invoice in step 320 may be received. Because the payment corresponds to the invoice, the corresponding account "A" may be inherited from the invoice. When payment is received, a credit of EUR 10 may be reflected in the receivables account. Because the EUR 10 payment must balance, a debit of EUR 10 may be reflected in the bank clearing.

At this time, the bank clearing is balanced. The bank clearing may reflect a debit of EUR 10 corresponding to account "Dummy" and a credit of EUR 10 corresponding to account "A" as shown in step 440.

Also in step 440, a clearing account may reflect the debit of EUR 10 corresponding to account "Dummy" as a credit and the credit of EUR 10 corresponding to account "A" as a debit. The debit side and credit side of the clearing are balanced, therefore the payment may be cleared. The clearing account, however, is replaced by the bank account (automatically or "on the fly") by the retrospective projection mechanism explained in FIG. 3. Because the payment must balance, the EUR 10 payment corresponding to account "Dummy" may now be viewed as a credit on the bank account. The payment is now cleared, and the bank account may reflect the EUR 10 payment as corresponding to account "A."

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A non-transitory computer-readable storage medium storing a computer-executable program which, when executed by a processor, performs a method for facilitating cash-based accounting for an entity, the method comprising:
   recording an incoming payment in a first line item in a cash ledger, the first line item comprising an entity account field, a revenue account field, and information from a bank statement entry;
   inserting a dummy identifier unassociated with any account in the entity account field of the first line item after recording the incoming payment;
   inserting a default value in the revenue account field of the first line item;
   updating a bank account in the cash ledger with cash relevant postings;
   receiving, after the incoming payment is recorded and from an invoice sent to a business partner, an entity account identifier corresponding to a payment owed by the business partner and a revenue account value, the payment being associated with goods or services received by the business partner;
   posting a second line item in the cash ledger comprising an entity account field, a revenue account field, and information about the incoming payment;
   entering the entity account identifier corresponding to the payment owed by the business partner into the entity account field of the second line item;
   entering the revenue account value into the revenue account field of the second line item;
   clearing the incoming payment by balancing the incoming payment and the payment owned by the business partner; and
   associating the information from the bank statement entry with the entity account identifier corresponding to the payment owed by the business partner and the revenue account value.

2. The non-transitory computer-readable storage medium of claim 1, wherein the method further comprises:
   providing a general ledger.

3. The non-transitory computer-readable storage medium of claim 1, wherein the cash ledger includes dimensions for a cash account and a revenue/expense account.

4. A computerized system for facilitating cash-based accounting for an entity, the system comprising:
   a processor; and
   a memory, wherein the processor and the memory are configured to perform a method comprising:
     recording an incoming payment in a first line item in a cash ledger, the first line item comprising an entity account field, a revenue account field, and information from a bank statement entry;
     inserting a dummy identifier unassociated with any account in the entity account field of the first line item after recording the incoming payment;
     inserting a default value in the revenue account field of the first line item;
     updating a bank account in the cash ledger with cash relevant postings;
     receiving, after the incoming payment is recorded and from an invoice sent to a business partner, an entity account identifier corresponding to a payment owed by the business partner and a revenue account value, the payment being associated with goods or services received by the business partner;
     posting a second line item in the cash ledger comprising an information about the incoming payment;
     entering the entity account identifier corresponding to the payment owned by the business partner into the entity account field of the second line item;

entering the revenue account value into the revenue account field of the second line item;

clearing the incoming payment by balancing the incoming payment and the payment owned by the business partner; and associating the information from the bank statement entry with the entity account identifier corresponding to the payment owed by the business partner and the revenue account value.

5. The system of claim 4, further comprising:

a general ledger.

6. The system of claim 4, wherein the cash ledger includes dimensions for a cash account and a revenue/expense account.

7. A computer-implemented method for facilitating cash-based accounting for an entity, the method comprising steps performed by a computer of:

recording, by a processor, an incoming payment in a first line item in a cash ledger, the first line item comprising an entity account field, a revenue account field, and information from a bank statement entry;

inserting, by the processor, a dummy identifier unassociated with any account in the entity account field of the first line item after recording the incoming payment;

inserting, by the processor, a default value in the revenue account field of the first line item;

updating, by the processor, a bank account in the cash ledger with cash relevant postings;

receiving, by the processor, after the incoming payment is recorded and from an invoice sent to a business partner, an entity account identifier corresponding to a payment owed by the business partner and a revenue account value, the payment being associated with goods or services received by the business partner;

posting, by the processor a second line item in the cash ledger comprising an entity account field, a revenue account field, and information about the incoming payment;

entering, by the processor, the entity account identifier corresponding to the payment owed by the business partner into the entity account field of the second line item;

entering, by the processor, the revenue account value into the revenue account field of the second line item;

clearing, by the processor, the incoming payment by balancing the incoming payment and the payment owned by the business partner; and associating, by the processor, the information from the bank statement entry with the entity account identifier corresponding to the payment owed by the business partner and the revenue account value.

8. The method of claim 7, further comprising:

providing a general ledger.

9. The method of claim 7, wherein the cash ledger includes dimensions for a cash account and a revenue/expense account.

\* \* \* \* \*